(12) United States Patent
Hiramatu et al.

(10) Patent No.: US 8,482,222 B2
(45) Date of Patent: Jul. 9, 2013

(54) LIGHTING DEVICE AND LIGHT FIXTURE USING LIGHTING DEVICE

(75) Inventors: Akinori Hiramatu, Nara (JP);
Hiromitsu Mizukawa, Suita (JP);
Yoshifumi Kuroki, Moriguchi (JP)

(73) Assignee: Panasonic Corporation, Osaka (JP)

( * ) Notice: Subject to any disclaimer, the term of this patent is extended or adjusted under 35 U.S.C. 154(b) by 283 days.

(21) Appl. No.: 13/083,170

(22) Filed: Apr. 8, 2011

(65) Prior Publication Data

US 2011/0248647 A1  Oct. 13, 2011

(30) Foreign Application Priority Data

Apr. 8, 2010 (JP) .................................. 2010-089634

(51) Int. Cl.
*G05F 1/00* (2006.01)
*H05B 37/00* (2006.01)
(52) U.S. Cl.
USPC ....................................... 315/297; 315/185 R
(58) Field of Classification Search
USPC ............................................. 315/185 R, 297
See application file for complete search history.

(56) References Cited

U.S. PATENT DOCUMENTS

2010/0109537 A1* 5/2010 Nishino et al. ............ 315/185 R
2011/0062870 A1* 3/2011 Kanbara ......................... 315/77

FOREIGN PATENT DOCUMENTS

JP    2008-278641    11/2008

* cited by examiner

*Primary Examiner* — Thienvu Tran
(74) *Attorney, Agent, or Firm* — Waddey & Patterson, P.C.; Mark J. Patterson; Gary L. Montle

(57) ABSTRACT

A lighting device reliably detects a status (i.e., existence or absence) of a load connection, and enables or disables power output based on the detected load connection status. The device includes a DC-DC converter having input and output terminals, and a DC current conducting element coupled across the output terminals. A load terminal is also coupled across the output terminals and configured to receive an LED unit. A load detection circuit coupled between an input terminal and the load terminal detects the connection status of an LED unit via a DC current passing through the load terminal, and controls a switching operation of the DC-DC converter based on the detected connection status. A diode coupled between the load terminal and the DC current conducting element blocks a DC current path from the input terminals to the load detection circuit through the DC current conducting element.

20 Claims, 5 Drawing Sheets

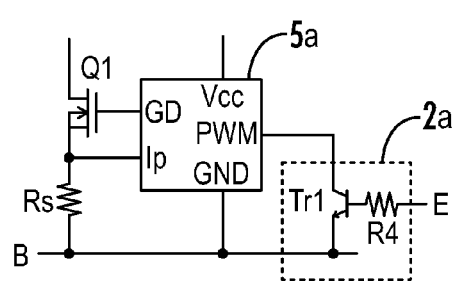
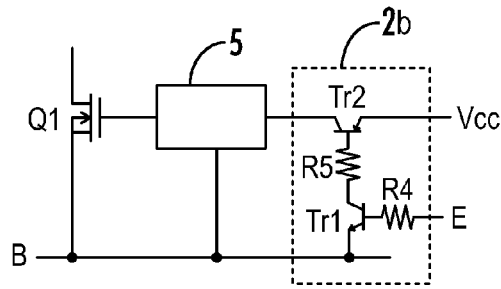
FIG. 3A   FIG. 3B
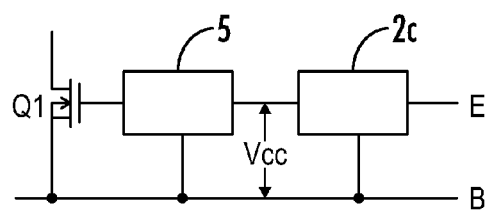
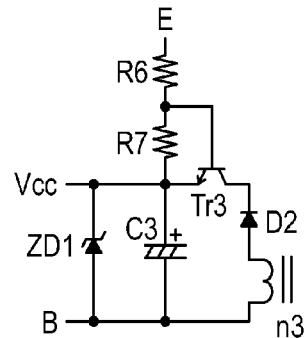
FIG. 3C   FIG. 3D
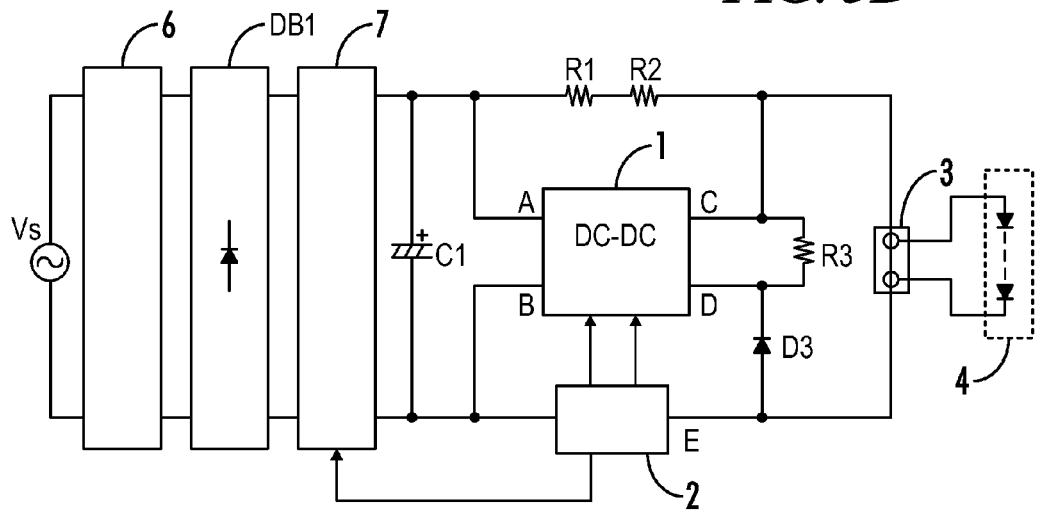
FIG. 4

LIGHTING DEVICE AND LIGHT FIXTURE USING LIGHTING DEVICE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: Japan Patent Application No. 2010-089634, filed Apr. 8, 2010.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a lighting assembly with load detection capability for reliably driving semiconductor light-emitting elements. More particularly, the present invention relates to a lighting device for performing DC lighting control of a semiconductor light-emitting element such as a light-emitting diode (LED) or the like, based on detection of the presence or absence of said light-emitting element.

In various conventional lighting devices that function to supply a DC current from an input DC power source to a semiconductor light-emitting element through a switching power converter, at power-on a DC starting current is fed to a control circuit associated with the converter to initiate a switching operation. A feedback current from the converter is subsequently supplied to the control circuit. Thereby, the converter is controlled so that the switching operation is started when the semiconductor light-emitting element is connected and the switching operation is not started when the semiconductor light-emitting element is not connected.

A switching power converter in various known examples includes a smoothing capacitor at an output terminal. To stabilize optical output, it is preferred that the capacitance of the smoothing capacitor is relatively large. However, upon turning the light off or during dimming control, while an electric charge remains in the smoothing capacitor the optical output of the semiconductor light-emitting element may not lower accordingly, possibly making a poor impression on the user regarding the control response. Thus, it can be considered as desirable to connect a discharge resistor in parallel to the smoothing capacitor.

However, when the discharge resistor is connected in parallel to the smoothing capacitor, even if the semiconductor light-emitting element is not connected, a switching operation may be initiated by a DC current supplied through the discharge resistor.

When the smoothing capacitor provided at the output terminal of the switching power converter has a relatively large capacitance, the switching power converter may be started by a charging current flowing through the smoothing capacitor at power-on. In this case, a problem occurs that even if the semiconductor light-emitting element is not connected to the circuit, the switching operation is maintained by a feedback current from the switching power converter. Further problems may occur in that even where the semiconductor light-emitting element is disconnected from the circuit after start of the switching operation, the switching operation may be maintained by the feedback current from the switching power converter.

BRIEF SUMMARY OF THE INVENTION

An object of the present invention is accordingly to provide a lighting device capable of reliably detecting a status (i.e., the existence or absence) of a load connection, and enabling or disabling power output based on the detected load connection status.

A lighting device according to an embodiment of the present invention includes a DC-DC converter having input and output terminals, and a DC current conducting element coupled across the output terminals. A load terminal is also coupled across the output terminals and configured to receive an LED unit. A load detection circuit coupled between an input terminal and the load terminal detects the connection status of an LED unit via a DC current passing through the load terminal, and controls a switching operation of the DC-DC converter based on the detected connection status. A rectifying element coupled between the load terminal and the DC current conducting element blocks a DC current path from the input terminals to the load detection circuit through the DC current conducting element.

In another embodiment, a light fixture includes a fixture main body having a portion covered with a light diffusing plate, a mounting substrate residing within the fixture main body, one or more LED units mounted on the substrate and outwardly disposed with respect to the light diffusing plate. A lighting device in accordance with the present invention is further provided which is effective to power the one or more LED units.

In another embodiment, an illumination system includes a plurality of light fixtures, each further comprising a fixture main body, a mounting substrate residing within the fixture main body, and one or more LED units mounted on the substrate and outwardly disposed. Each of the LED units are coupled in series across the plurality of light fixture, and a lighting device in accordance with the present invention is coupled to a first LED unit and effective to drive the cascade-coupled series of LED units.

BRIEF DESCRIPTION OF THE SEVERAL VIEWS OF THE DRAWINGS

FIGS. 3A-3D are circuit diagrams representing various embodiments of a load detection circuit in a lighting device of the present invention.

FIG. 4 is a circuit diagram representing another embodiment of a lighting device in accordance with the present invention.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least one current, voltage, charge, temperature, data or a state of one or more memory locations as expressed on one or more transmission mediums.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The term "control circuit" or "controller" as may be used interchangeably herein refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Figure 1:
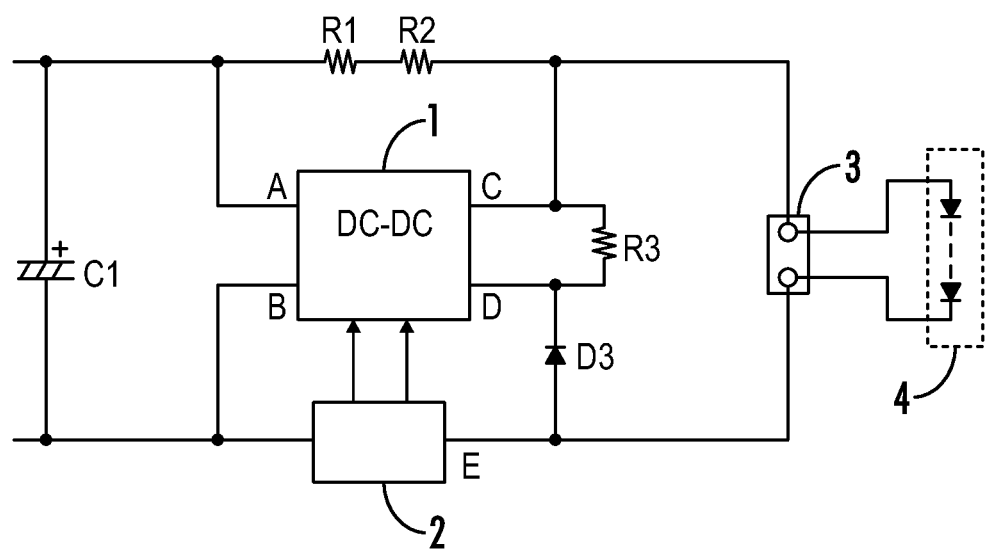
FIG. 1 is a circuit diagram representing an embodiment of a lighting device in accordance with the present invention.

Referring first to FIG. 1, an embodiment of a lighting device in accordance with the present invention includes a DC-DC converter 1 for receiving and converting a DC voltage across capacitor C1 as an input DC power source. Here, it may be assumed that the capacitor C1 as the input DC power source is charged with a DC voltage, based on a commercial power source (100V, 50/60 Hz) that is rectified by a full-wave rectifier and stepped up to a few hundreds of V by, for example, a power factor correction circuit as is known in the art.

The DC-DC converter 1 may be a step-down converter (buck converter) that reduces the DC voltage across input terminals A and B and outputs the reduced voltage across output terminals C and D. Various embodiments of a corresponding circuit configuration may be described below with reference to FIG. 2A to 2C. The circuit 1 generally includes a smoothing output capacitor C2 coupled across the output terminals C and D. To rapidly discharge the output capacitor C2 at light-off control or dimming control for improved response, a resistor R3 (FIG. 1) having an appropriate resistance value is coupled in parallel across the output terminals C and D.

A load terminal 3 is connected across the output terminals C and D via a backflow preventing diode D3 and is configured to receive a semiconductor light-emitting element 4. The semiconductor light-emitting element 4 may be, for example, an LED module formed of a plurality of series-connected, parallel-connected or series-parallel-connected LEDs. Given that a forward voltage of each LED is Vf and the number of series-connected LEDs is n, the voltage across the semiconductor light-emitting element 4 may be represented by n×Vf. When the semiconductor light-emitting element 4 is properly connected to the load terminal 3, the voltage across the load terminal 3 therefore becomes n×Vf. As described above, because the DC-DC converter 1 is a step-down converter (buck converter), the DC voltage of the capacitor C1 as an input DC power source is set to be higher than n×Vf.

Figure 2A:
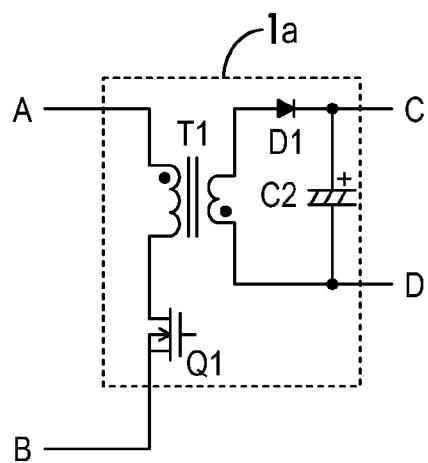
FIGS. 2A, 2B and 2C are circuit diagrams representing various embodiments of a DC-DC converter in a lighting device of the present invention.
Figure 2B:
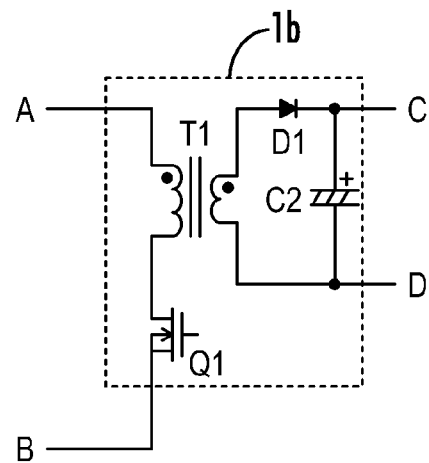

When the DC-DC converter 1 is an isolated converter as shown in FIGS. 2A and 2B, a series circuit formed of resistors R1, R2 (FIG. 1) coupled between the input terminal A and the output terminal C may define a high-impedance DC current carrying circuit for ensuring a path in which DC current passes between input and output. When a step-down chopper circuit as shown in FIG. 2C is used as the DC-DC converter 1, a short circuit may accordingly be defined between the input terminal A and the output terminal C.

A load detection circuit 2 is coupled on one end (i.e., load connection detecting terminal E) to a node between the load terminal 3 and the diode D3, and on the other end to the DC power input terminal B. The load detection circuit 2 may in various embodiments generally be effective to detect the existence or absence of load connection depending on whether or not the DC voltage is detected across the load connection detecting terminal E and the input terminal B. Various embodiments of a corresponding circuit configuration may be described below with reference to FIGS. 3A to 3D. Briefly stated, the circuit may be configured or otherwise effective to start (initiate) an oscillating operation of the DC-DC converter 1 when a DC current path from a positive electrode of the capacitor C1 as the input DC power source to a negative electrode of the capacitor C1 through the input terminal A, (the resistors R1, R2), the output terminal C, the load terminal 3, the semiconductor light-emitting element 4, the load terminal 3, the load connection detecting terminal E, the load detection circuit 2 and the input terminal B is established, and stopping (disabling) the oscillating operation of the DC-DC converter 1 when the aforementioned DC current path is blocked.

Although the diode D3 is coupled between the output terminal D and the load terminal 3 in the circuit represented in FIG. 1, the diode D3 may alternatively be coupled between the output terminal C and the load terminal 3. Without the diode D3, the DC current passing through the resistor R3 is supplied between the terminals E and B. By providing the diode D3, the path for supplying the DC current between the terminals B and E is limited to a path through the load terminal 3 and the semiconductor light-emitting element 4, and thus connection failure and existence or absence of a break (open circuit) in this path can be reliably detected.

Figure 2C:
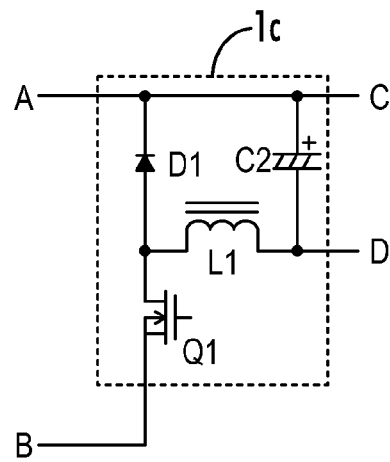

Referring now to FIGS. 2A to 2C, various embodiments of a configuration for the DC-DC converter 1 from FIG. 1 may be described. FIG. 2A represents a flyback converter circuit 1a, FIG. 2B represents a forward converter circuit 1b and FIG. 2C represents a step-down chopper (buck converter) circuit 1c. These are merely examples and any circuit configuration effective to reduce the DC voltage across input terminals A and B and output the reduced voltage across output terminals C and D may be similarly employed within the scope of the present invention. Further, as shown in FIG.

2C, any one of the input terminals A and B and any one of the output terminals C and D may in an embodiment be one common terminal.

The flyback converter circuit 1*a* example as represented in FIG. 2A includes a transformer T1, a switching element Q1, a diode D1 and a capacitor C2. One end of a primary winding of the transformer T1 is coupled to the input terminal A. The other end of the primary winding of the transformer T1 is coupled to the input terminal B through the switching element Q1. One end of a secondary winding of the transformer T1 is coupled to an anode of the diode D1. The cathode of the diode D1 is coupled to the output terminal C. The capacitor C2 is coupled between the output terminals C and D. The other end of the secondary winding of the transformer T1 is coupled to the output terminal D. The primary winding and the secondary winding of the transformer T1 are wound in directions represented by the black circles shown in this figure.

Operation of the flyback converter circuit 1*a* is well known in the art. When the input DC voltage is applied to the primary winding of the transformer T1 at turn-on of the switching element Q1, a voltage corresponding to a turns ratio occurs at the secondary winding. However, no charging current flows to the capacitor C2 due to the polarity of the blocking diode D1 coupled to the secondary winding, and electromagnetic energy is therefore accumulated in the transformer T1. When the switching element Q1 is turned off, a counter electromotive force occurs due to the electromagnetic energy accumulated in the transformer T1. Because the counter electromotive force occurs in a conductive direction with respect to the diode D1, the electromagnetic energy accumulated in the transformer T1 is discharged to the capacitor C2. By variably controlling the ON/OFF cycle or an ON time width of the switching element Q1, electric power supplied to an output side can be properly controlled.

The forward converter circuit 1*b* as represented in FIG. 2B may be formed by reversing the winding direction of the secondary winding of the transformer T1 in FIG. 2A, and the diode D1 becomes conductive at turn-on of the switching element Q1. When the input DC voltage is applied to the primary winding of the transformer T1 at turn-on of the switching element Q1, a voltage corresponding to the turns ratio occurs at the secondary winding, the diode D1 becomes conductive, and a charging current flows to the capacitor C2. At turn-off of the switching element Q1, the diode D1 is put into the blocked state. By variably controlling the ON/OFF cycle or the ON time of the switching element Q1, electric power supplied to an output side can be properly controlled.

The step-down chopper circuit 1*c* represented in FIG. 2C includes the switching element Q1, an inductor L1, the diode D1 and the capacitor C2. The cathode of diode D1 and a positive electrode of the capacitor C2 are coupled to the input terminal A and the output terminal C. A negative electrode of capacitor C2 and one end of the inductor L1 are coupled to the output terminal D. The other end of inductor L1 is coupled to the anode of diode D1. A node between the anode of diode D1 and inductor L1 is further coupled to input terminal B through switching element Q1.

Various operations of the step-down chopper circuit 1*c* are further well known in the art. When the switching element Q1 is turned on, a DC current flows through a path including input terminal A, capacitor C2, inductor L1, switching element Q1 and input terminal B in this order, and electromagnetic energy is accumulated in the inductor L1. When switching element Q1 is turned off, a counter electromotive force due to the electromagnetic energy accumulated in the inductor L1 occurs, a regenerative current flows in a path of inductor L1, diode D1, capacitor C2 and inductor L1 in this order and the electromagnetic energy in the inductor L1 is discharged. By repeating this operation, the DC voltage obtained by reducing the DC voltage across input terminals A and B can be acquired across output terminals C and D. By variably controlling the ON/OFF cycle or ON time of the switching element Q1, electric power supplied to the output side can be properly controlled.

Referring now to FIGS. 3A to 3D, various embodiments of a circuit configuration of the load detection circuit 2 from FIG. 1 may be described. The switching element Q1 refers to the switching element of the DC-DC converter 1 (with further reference to FIGS. 2A to 2C).

A load detection circuit 2*a* as represented in FIG. 3A is formed of a transistor Tr1 and a resistor R4. The base of transistor Tr1 is coupled to the load connection detecting terminal E through resistor R4. The emitter of transistor Tr1 is coupled to a ground terminal GND of a controller integrated circuit (IC) 5*a* and the input terminal B of the DC-DC converter 1. When the DC voltage is applied across terminals E and B, transistor Tr1 is turned on. When the DC voltage across terminals E and B disappears, transistor Tr1 is turned off. Turn-on of the transistor Tr1 acts as a starting signal for the controller IC 5*a* and turn-off of transistor Tr1 acts as a stop signal for the controller IC 5*a*.

The controller IC 5*a* in FIG. 3A includes a PWM terminal for intermittently turning on/off the high-frequency oscillating operation with low frequency. This PWM terminal is pulled up to the level of a control power source voltage Vcc on a steady basis, is allowed to oscillate when becoming a Low level at turn-on of the external transistor Tr1, and stops its oscillation when becoming a High level at turn-off of the transistor Tr1. When the PWM terminal is at a Low level, a high-frequency ON/OFF control signal is input to a gate drive terminal GD, and the switching element Q1 of the DC-DC converter 1 is driven to be turned on/off with high frequency. The controller IC 5*a* may include a peak current detecting terminal Ip for monitoring a voltage across a current detecting resistor Rs while switching element Q1 is turned on, to perform a peak current control function of turning off switching element Q1 when a predetermined current value is reached. As an example of the controller IC 5*a* having such function, UBA3070 manufactured by Philips Co., Ltd. can be adopted. It is assumed that a stable low DC voltage as the control power source voltage Vcc in FIG. 3(*a*) may be supplied from a separate control circuit (not shown).

A load detection circuit 2*b* as represented in FIG. 3B may be formed of transistors Tr1, Tr2 and resistors R4, R5. The base of transistor Tr1 is coupled to the load connection detecting terminal E through the resistor R4. The emitter of transistor Tr1 is coupled to a ground terminal of a control circuit 5 and the input terminal B of the DC-DC converter 1. The collector of transistor Tr1 is coupled to the base of transistor Tr2 through resistor R5. The emitter of transistor Tr2 is coupled to the control power source voltage Vcc. The collector of transistor Tr2 is coupled to a control power source terminal of the control circuit 5. It is assumed that a stable low DC voltage as the control power source voltage Vcc in FIG. 3B may be supplied from a separate control circuit (not shown).

When the DC voltage is applied across terminals E and B, the transistors Tr1, Tr2 are turned on and the control power source voltage Vcc is supplied to the control circuit 5. When the DC voltage applied across terminals E and B disappears, the transistors Tr1, Tr2 are turned off and the control power source voltage Vcc supplied to the control circuit 5 is blocked. That is, supply of the control power source voltage Vcc to the control circuit 5 acts as a starting signal for the DC-DC converter 1. Blocking of the control power source voltage Vcc supplied to the control circuit 5 acts as the stop signal for the DC-DC converter 1.

In an example as represented in FIG. 3C, a control circuit 2c itself may be the load detection circuit. For example, the control circuit 2c in FIG. 3C may be a three-terminal regulator IC or may be a control circuit using an IPD (Intelligent Power Device). When the DC voltage is supplied across the load connection detecting terminal E and the input terminal B, the control circuit 2c converts the DC voltage into a stable low DC voltage, outputs the voltage as the control power source voltage Vcc and supplies the control power source voltage Vcc to a control power source terminal of the control circuit 5.

In the examples represented in FIG. 3B or FIG. 3C, the same function as in FIG. 3A can be achieved by using the control circuit 5 without the PWM terminal for controlling oscillation permission/oscillation stop from the outside. The control circuit 5 in FIG. 3B or FIG. 3C may further have a power source monitoring function of initiating oscillation when the control power source voltage becomes higher than a first voltage Vth1 and disabling oscillation when the control power source voltage becomes lower than a second voltage Vth2 that is lower than the first voltage Vth1. Many commercially available switching regulator control IC have such a power source monitoring function.

An exemplary circuit configuration for the control circuit 2c in FIG. 3C may be as represented in FIG. 3D. This power source circuit includes resistors R6, R7, a power source capacitor C3, a Zener diode ZD1, a transistor Tr3, a diode D2 and a current feedback winding n3. In this example, the current feedback winding n3 is added to the transformer T1 of the DC-DC converter in FIG. 2A to efficiently ensure the control power source voltage Vcc at stable lighting by using the feedback current. When the DC voltage is supplied across the load connection detecting terminal E and the input terminal B, capacitor C3 is charged through the resistors R6, R7. When the charging voltage of capacitor C3 becomes higher than the first voltage Vth1 of the power source monitoring function of the control circuit 5, the high-frequency ON/OFF control signal is supplied from the control circuit 5 to the switching element Q1 to start the DC-DC converter. Thereby, the feedback current can be obtained from the current feedback winding n3. When the DC voltage is supplied across the load connection detecting terminal E and the input terminal B, because transistor Tr3 is forward biased by resistor R7 and is turned on, capacitor C3 is charged from the current feedback winding n3 through diode D2 and transistor Tr3. The charging voltage of capacitor C3 is restricted by Zener diode ZD1. Thereby, the control power source voltage Vcc is efficiently ensured.

When connection failure or break of the path passing through the load terminal 3 and the semiconductor light-emitting element 4 occurs, the load connection detecting terminal E in FIG. 1 is opened. Thus, a bias current through resistor R7 disappears, turning off transistor Tr3. For this reason, the charging current supplied from the current feedback winding n3 to capacitor C3 disappears and the voltage across capacitor C3 gradually decreases. When the voltage across capacitor C3 becomes lower than the second voltage Vth2 of the power source monitoring function of the control circuit 5, oscillation of the control circuit 5 is disabled and the high-frequency ON/OFF control signal supplied to the switching element Q1 (and accordingly the DC-DC converter) is further disabled. The feedback current from the current feedback winding n3 of the transformer T1 also stops as a result of the same.

The current feedback winding n3 in FIG. 3D may be provided at transformer T1 in FIG. 2B or the inductor L1 in FIG. 2C. The transistor Tr3 that blocks a current of the current feedback winding n3 is not limited to a bipolar type and may be an MOS type as long as it is configured to be turned on by the DC voltage across terminals E and B.

Although the above description is made on an assumption that the DC-DC converter 1 is an externally driven converter, it may alternatively be a self-oscillating converter. In this case, enable/disable of the converter may be controlled according to the existence or absence of DC voltage across terminals E and B.

Although the resistor R3 for discharging the remaining charge in the smoothing capacitor C2 at the output terminal of the DC-DC converter 1 is exemplified above as the DC current conducting element coupled between the output terminals C and D, the DC current conducting element is not so limited to the resistor R3. For example, a Zener diode for suppressing an overvoltage at break of the load (open circuit) may be coupled in parallel with the output terminal of the DC-DC converter 1. The Zener diode in this case may also define the DC current conducting element.

The DC current conducting element coupled across the output terminals C and D is not limited to a circuit component having a steady DC current carrying capability and may be a circuit component having a transient DC current carrying capability, in which an integrated value of the transient DC current at an initial power-on stage exceeds a predetermined value. For example, with configurations as represented in FIGS. 3C and 3D, when the capacitance of output capacitor C2 of the DC-DC converter 1 is set so large that the voltage across power source capacitor C3 exceeds the first voltage Vth1 of the control circuit 5 at the initial stage of power-on, the output capacitor C2 may define a transient DC current conducting element. Conversely, where the output capacitor of the switching power converter does not have such a large capacitance to charge the power source capacitor of the control circuit up to the operation starting voltage of the control circuit at the initial stage of power-on, as is the case for various systems as conventionally known in the art, the output capacitor does not correspond to the transient DC current conducting element described herein.

In various embodiments in accordance with the present invention, the step-down converter (buck converter) may be used as the DC-DC converter 1 on an assumption that the semiconductor light-emitting element 4 has a diode characteristic with a predetermined conducting threshold. In the case where the semiconductor light-emitting element 4 has an ohmic resistor or is an LED module in which a high resistance for detecting load connection is coupled in parallel to an LED series circuit, even when the DC-DC converter 1 is a step-up converter (boost converter), it is possible to detect the existence or absence of load connection before startup.

In an embodiment as represented in FIG. 4, a lighting device in accordance with the present invention differs from certain embodiments as previously described in that enable/disable of a step-up chopper circuit 7 for increasing the DC voltage of the capacitor C1 as the input DC power source is controlled according to detection of existence/absence of load connection by the load detection circuit 2.

A full-wave rectifier DB1 may be connected to the commercial power source Vs (100V, 50/60 Hz) through a filter circuit 6. To improve input power factor, an output of the full-wave rectifier DB1 is coupled to the step-up chopper circuit 7. The step-up chopper circuit 7 charges capacitor C1 with the DC voltage that is higher than a peak value of a pulsating voltage obtained by full-wave rectification of the voltage of the commercial power source.

It may generally be undesirable that, when the DC-DC converter 1 is disabled by the load detection circuit 2, the DC voltage across capacitor C1 is kept in a increased state. Thus, in an embodiment, when the load detection circuit 2 does not detect load connection, the stop signal is fed to the step-up chopper circuit 7, thereby causing the step-up chopper circuit 7 to disable a voltage increasing operation. When the load detection circuit 2 detects load connection, the start signal is fed to the step-up chopper circuit 7, thereby causing the step-up chopper circuit 7 to enable/initiate the voltage raising operation.

Figure 5:
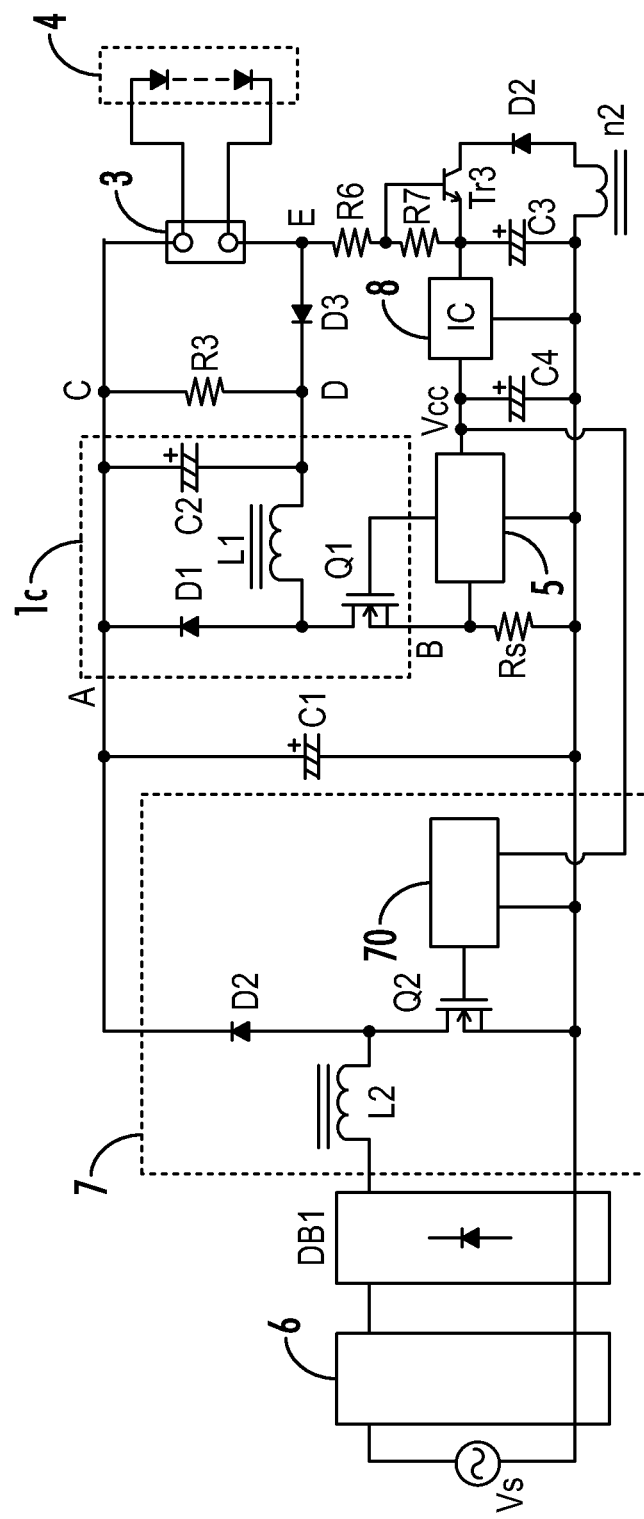
FIG. 5 is a circuit diagram detailing an exemplary configuration of the lighting device of FIG. 4.

Referring now to an embodiment as represented in FIG. 5, the step-down chopper circuit 1c represented in FIG. 2C may be used as the DC-DC converter 1 in FIG. 4. The configuration represented in FIG. 3D may be used as the load detection circuit 2 in FIG. 4. Although the secondary winding of inductor L1 of the step-down chopper circuit 1c is used in the embodiment shown as a current feedback winding n2, the secondary winding of an inductor L2 of the step-up chopper circuit 7 may alternatively be used. To stabilize the voltage across capacitor C3, a power source IC8 such as a three-terminal regulator and a capacitor C4 are added in place of the Zener diode ZD1 in FIG. 3D.

The step-up chopper circuit 7 includes the inductor L2, the diode D2, a switching element Q2 and a control circuit 70. One end of inductor L2 is coupled to a positive output terminal of the full-wave rectifier DB1. The other end of inductor L2 is coupled to the anode of diode D2 and one end of switching element Q2. The other end of switching element Q2 is coupled to a negative output terminal of full-wave rectifier DB1 and the negative electrode of capacitor C1. The cathode of diode D2 is coupled to the positive electrode of capacitor C1.

Operation of the step-up chopper circuit 7 may take various forms as publicly known to those of skill in the art. In an embodiment, when the switching element Q2 is turned on, current flows from the positive output terminal of the full-wave rectifier DB1 to the negative output terminal of the full-wave rectifier DB1 through inductor L2 and switching element Q2, thereby drawing the input current from the commercial power source Vs. When the switching element Q2 is turned off, a counter electromotive force in inductor L2 is superimposed onto the output voltage of full-wave rectifier DB1 and capacitor C1 is charged through diode D2. Also at this time, the input current is drawn from the commercial power source Vs. Because the ON/OFF frequency of switching element Q2 is sufficiently higher than the frequency of the commercial power source Vs, and a high-frequency component of the input current is removed by filter circuit 6, an input current waveform becomes similar to an input voltage waveform, improving the input power factor.

The step-up chopper circuit 7 is necessary for improving the input power factor. However, because the input current is small in the case of small power consumption, even when the voltage raising operation is stopped, negative effect on the input power factor is small. Thus, when the DC voltage is not detected by the load connection detecting terminal E, operation of the step-down chopper circuit 1c as well as the step-up chopper circuit 7 is stopped. Thereby, the capacitor C1 is prevented from being charged with the increased DC voltage upon disabling of the step-down chopper circuit 1c. Moreover, circuit losses in the step-up chopper circuit 7 can be avoided.

Because the control power source voltage Vcc of capacitor C4 is zero immediately after power-on, the step-up chopper circuit 7 stops its operation and capacitor C1 is charged up to a peak value (about 140V) of the output voltage of the full-wave rectifier DB1 through inductor L2 and diode D2. Thus, the DC current flows in a path of the positive electrode of capacitor C1, terminal A, terminal C, load terminal 3, semiconductor light-emitting element 4, load terminal 3, terminal E, resistor R6, resistor R7, capacitor C3 and the negative electrode of capacitor C1 to charge capacitor C3. The voltage across capacitor C3 increases and capacitor C4 can obtain a stable DC voltage through the power source 1C8. By supplying the DC voltage as the control power source voltage Vcc to the control circuit 5 and the control circuit 70, the step-down chopper circuit 1c and the step-up chopper circuit 7 initiate their operations. Thereby, the feedback current by the switching operation is supplied from the current feedback winding n2 to capacitor C3 through diode D2 and transistor Tr3, resulting in that the control power source voltage Vcc can be efficiently obtained.

When the DC current path through the load terminal 3 and the semiconductor light-emitting element 4 is blocked due, for example, to a break of a lead wire connecting the load terminal 3 to the semiconductor light-emitting element 4, a connection failure of the load terminal 3, a break in the semiconductor light-emitting element 4, or the like, the load connection detecting terminal E is opened and base bias at transistor Tr3 disappears, resulting in the feedback current from the current feedback winding n2 being blocked and both the control circuit 5 and the control circuit 70 stopping or otherwise becoming disabled.

Figure 6:
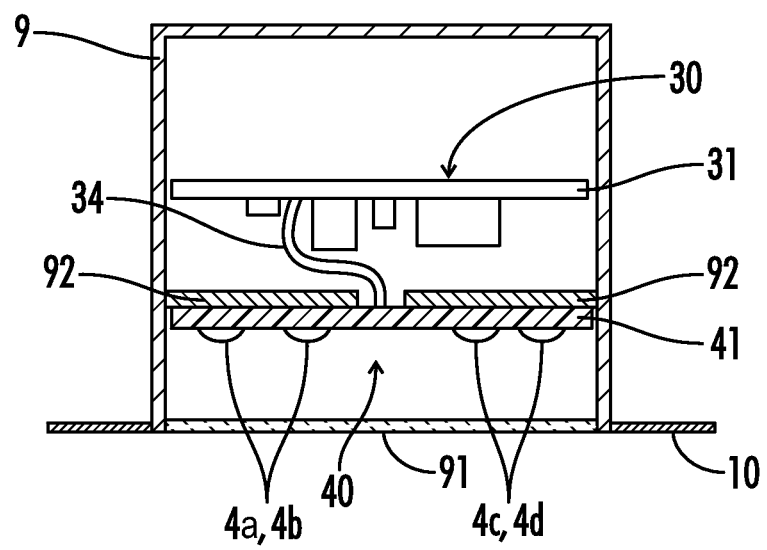
FIG. 6 is a sectional view representing a light fixture incorporating a lighting device of the present invention.

FIG. 6 shows an example of a light fixture using the lighting device of the present invention. This example is an integrated LED light fixture in which a power source unit 30 and an LED unit 40 are stored in a fixture main body 9. The electronic circuit including the load terminal 3 in FIG. 1 is mounted on the power source unit 30. The load terminal 3 of the power source unit 30 is coupled to the LED unit 40 via an output wiring 34.

The fixture main body 9 may be embedded in for example a ceiling 10. The fixture main body 9 may be formed of a metal cylindrical body, a lower end of which is opened, and a lower end opened portion is covered with a light diffusing plate 91. The LED unit 40 is outwardly disposed in opposition to or otherwise arranged to provide illumination through the light diffusing plate 91. An LED mounting substrate 41 mounts LEDs 4a to 4d in the LED unit 40. In this example, a heat radiating plate 92 thermally coupled to the fixture main body 9 is provided on the back side of the mounting substrate 41 of the LED unit 40 attached in the fixture. By radiating heat generated by the LEDs 4a to 4d through the heat radiating plate 92, temperature of the LEDs 4a to 4d is lowered, thereby advantageously increasing an optical output.

Although the LED unit 40 in which the four LEDs 4a to 4d are coupled in series is used in the example shown in FIG. 6, in various embodiments of a lighting device such as represented for example in FIG. 1, the number of series-coupled LEDs is not so limited as long as the load voltage is lower than the voltage of the capacitor C1.

The lighting device of the present invention may be used in a separately-installed power source-type LED light fixture in which the power source unit 30 is separated from the LED unit 40. In this case, for example, a first LED unit having four series-connected LEDs may be cascade-connected to a second LED unit having eight series-connected LEDs, allowing the fixture to be powered by the output of one lighting device, thereby reducing costs of an entire illumination system defined by the lighting device and the one or more LED units. The number of series-connected LEDs used in each LED unit is not limited.

The lighting device of the present invention may be used as a backlight of a liquid crystal display (including a liquid crystal television) and a light source for vehicles in addition to the lighting device for the light fixture. In the case of the lighting device for vehicles or the like, which is used in an environment with much vibration, a load release failure can occur due to vibration. Since the lighting device of the present invention can be shifted to the oscillation disabling state even when the load release failure occurs, using the lighting device of the present invention can avoid excessive power consumption and circuit failure.

Any embodiment may be configured to turn on and off an alarm LED or keep the alarm LED on, or output an alarm signal such as alarm sound to the outside when the load detection circuit does not detect load connection.

Thus, although there have been described particular embodiments of the present invention of a new and useful Lighting Device and Light fixture Using Lighting Development it is not intended that such references be construed as limitations upon the scope of this invention except as set forth in the following claims.

What is claimed is:

1. A lighting device comprising:
    a DC-DC converter having first and second DC power input terminals coupled to a DC power source, a switching element, and first and second DC power output terminals;
    a DC current conducting element coupled across the DC power output terminals;
    a load terminal having first and second semiconductor light-emitting element connection terminals;
    a load detection circuit coupled on a first end to the second DC power input terminal and on a second end to the load terminal, the load detection circuit effective to detect a DC voltage across the first and second ends of the load detection circuit and to control a switching operation of the DC-DC converter based on the detected DC voltage; and
    a diode coupled between the load terminal and the DC current conducting element, the diode effective to block a DC current path from the DC power input terminals to the load detection circuit through the DC current conducting element.

2. The lighting device of claim 1, the load detection circuit further comprising a starting circuit effective to enable the DC-DC converter when the DC voltage is detected across the first and second ends of the load detection circuit.

3. The lighting device of claim 2, the load detection circuit further comprising a disabling circuit effective to disable the DC-DC converter when the DC voltage is not detected across the first and second ends of the load detection circuit.

4. The lighting device of claim 1, the load detection circuit effective to supply a control power source voltage to the DC-DC converter based on the detected existence or absence of DC current passing through the load terminal.

5. The lighting device of claim 4, the load detection circuit further comprising a control circuit effective to supply a control power source voltage to the DC-DC converter using the DC current passing through the load terminal as a power source.

6. The lighting device of claim 5, the control circuit effective to use a feedback current from the DC-DC converter as a power source and block the feedback current when the DC current passing through the load terminal is not detected during operation of the DC-DC converter.

7. The lighting device of claim 6, further comprising a power factor correction circuit as the DC power source, the load detection circuit effective to enable and disable the step-up chopper circuit according to the detected existence or absence of the DC current passing through the load terminal.

8. The lighting device of claim 1, the DC-DC converter comprising a transformer having a first winding coupled to the input terminals and a galvanically isolated second winding coupled to the output terminals,
    the lighting device further comprising a resistive network coupled between the first DC power input terminal and the first DC power output terminal and effective to define a high impedance current path.

9. The lighting device of claim 1, the DC-DC converter comprising an inductor coupled on a first end to a node between the DC power input terminals and on a second end to a node between the DC power output terminals, the first DC power input terminal further coupled to the first DC power output terminal to define a short circuit.

10. A light fixture comprising:
    a fixture main body having a portion covered with a light diffusing plate;
    a mounting substrate residing within the fixture main body;
    one or more LED units mounted on the substrate and outwardly disposed with respect to the light diffusing plate; and
    a lighting device further comprising
        a DC-DC converter having first and second DC power input terminals, a switching element, and first and second DC power output terminals,
        a DC current conducting element coupled across the DC power output terminals,
        a load terminal effective to receive at least one of the one or more LED units,
        a load detection circuit coupled between the second DC power input terminal and the load terminal, and effective to detect a DC current passing through an LED unit received by the load terminal, and further effective to control a switching operation of the DC-DC converter based on the detected DC current,
        a diode coupled between the load terminal and the DC current conducting element, the diode effective to block a DC current path from the DC power input terminals to the load detection circuit through the DC current conducting element.

11. The light fixture of claim 10, the load detection circuit further comprising a starting circuit effective to enable the DC-DC converter when DC current is detected through one or more LED units received by the load terminal.

12. The light fixture of claim 11, the load detection circuit further comprising a disabling circuit effective to disable the DC-DC converter when DC current is not detected through one or more LED units received by the load terminal.

13. The light fixture of claim 10, the load detection circuit further comprising a control circuit effective to supply a control power source voltage to the DC-DC converter using DC current passing through the load terminal as a power source.

14. The light fixture of claim 13, the control circuit effective to use a feedback current from the DC-DC converter as a power source and to block the feedback current when DC current passing through the load terminal is not detected during operation of the DC-DC converter.

15. The light fixture of claim 14, further comprising a power factor correction circuit as the DC power source, the load detection circuit effective to enable and disable the step-up chopper circuit according to the detected existence or absence of the DC current passing through the load terminal.

16. The light fixture of claim 10, the DC-DC converter comprising a transformer having a first winding coupled to the input terminals and a galvanically isolated second winding coupled to the output terminals, the lighting device further comprising a resistive network coupled between the first DC power input terminal and the first DC power output terminal and effective to define a high impedance current path.

17. The light fixture of claim 10, the DC-DC converter comprising an inductor coupled on a first end to a node between the DC power input terminals and on a second end to a node between the DC power output terminals, the first DC power input terminal further coupled to the first DC power output terminal to define a short circuit.

18. An illumination system comprising:

a plurality of light fixtures, each further comprising a fixture main body, a mounting substrate residing within the fixture main body, and one or more LED units mounted on the substrate and outwardly disposed;

said LED units coupled in series across the plurality of light fixtures; and a lighting device coupled to a first LED unit and further comprising a DC-DC converter having first and second DC power input terminals, a switching element, and first and second DC power output terminals, a DC current conducting element coupled across the DC power output terminals, a load terminal effective to receive said first LED unit, a load detection circuit coupled between the second DC power input terminal and the load terminal, and effective to detect a DC current passing through said LED unit, and further effective to control a switching operation of the DC-DC converter based on the detected DC current, a diode coupled between the load terminal and the DC current conducting element, the diode effective to block a DC current path from the DC power input terminals to the load detection circuit through the DC current conducting element.

19. The illumination system of claim 18, the load detection circuit further comprising a control circuit effective to supply a control power source voltage to the DC-DC converter using DC current passing through the load terminal as a power source.

20. The illumination system of claim 19, the control circuit effective to use a feedback current from the DC-DC converter as a power source and to block the feedback current when DC current passing through the load terminal is not detected during operation of the DC-DC converter.

* * * * *